United States Patent Office 3,539,348
Patented Nov. 10, 1970

3,539,348
PHOTOGRAPHIC MATERIAL FOR THE SILVER-DYE-BLEACH PROCESS
Hans Vetter, Cologne-Stammheim, Karl-Heinz Freytag, Leverkusen-Steinbuechel, Bernhard Seidel, Cologne-Mulheim, and Erich Böckly, Leverkusen, Germany, assignors to Agfa-Gevaert Aktiengesellschaft, Leverkusen, Germany, a corporation of Germany
No Drawing. Filed Apr. 11, 1967, Ser. No. 629,928
Claims priority, application Germany, Apr. 28, 1966, A 52,295
Int. Cl. G03c 1/10
U.S. Cl. 96—99
9 Claims

ABSTRACT OF THE DISCLOSURE

Certain sulfonated amino naphthol azo dyes are particularly brilliant and light-fast magenta dyes for silver-dye-bleach photographic use.

---

It is known that color photographic images can be produced by the silver-dye-bleach process, wherein a dye, usually an azo dye, is bleached in a homogeneously dyed colloid layer in accordance with a silver image which had been produced photographically.

According to this process, it is possible to produce both negatives and reversal images. If it is desired to produce positive paper prints or duplicate positives from diapositives, the silver image is produced by means of a simple black-and-white development, this silver image representing a negative of the copying original. Since the image dye which is homogeneous-distributed in the layer (or in the 3 layers of a multicolor material) is bleached proportionately to the silver image a dye image is obtained, which is positive with respect to the original. If a silver image is produced which is positive with respect to the original, for example, by a black-and-white reversal development or by the bromide ion diffusion method or silver salt diffusion method, then after the color bleaching a dye image is formed which is opposite in gradation to the original, that is to say a positive color image is formed if the original is a negative color image.

The dyes which are to be used in the silver-dye-bleach process must meet particularly high standards, since these dyes not only have to be spectrally suitable, but also have to be easily bleached and have a substantial fastness to light. In addition, they must not adversely affect the photographic emulsion and must be completely resistant to diffusion in gelatin, which is the material almost exclusively used for formation of the layer. Particularly important are the properties of high fastness to the action of light and resistance to acid gases such as occur, e.g., in the air of industrial regions. Other desirable properties are high brilliance, i.e., freedom from side absorptions in undesirable regions of the spectrum, as well as enhanced absorption in the desired spectral range.

It has already been proposed that metal complex dyes be used in this process, owing to their increased fastness to light. It was found, however, that metal complex dyes generally are insufficiently brilliant and they are therefore of limited practical use for the present process.

It is among the objects of the present invention to provide new magenta azo dyes which are particularly suitable for use in the silver-dye-bleach process.

The above object has been attained by providing magenta dyes of the following formula:

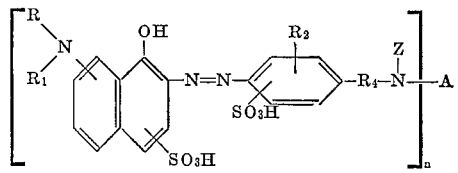

wherein

R=(1) hydrogen, (2) alkyl, preferably with up to 5 carbon atoms, such as methyl, ethyl, propyl and isopropyl, in which the alkyl groups may be substituted with hydroxyl, alkoxy having preferably up to 3 carbon atoms, amino, alkyl-amino the alkyl group of which has up to 3 carbon atoms, carboxyl, sulfo, carbonamido, e.g., the following groups: Methoxypropyl, hydroxyethyl, dimethylaminopropyl, carboxymethyl, sulfoethyl, carbonamidomethyl, or (3) aryl, preferably phenyl, which may be substituted, e.g., by alkyl with preferably up to 3 carbon atoms, halogen such as chlorine or bromine, alkoxy with preferably up to 3 carbon atoms, or a sulfo group;

$R_1$=acyl, in particular those derived from carboxylic acid or sulfonic acids, for example from aliphatic carboxylic acids having up to 5 carbon atoms, such as acetyl, propionyl, butyryl, chloroacetyl, cyanoacetyl, $\beta$- or $\alpha$-chloropropionyl, methoxyacetyl, methoxypropionyl as well as other low carboxyacyl radicals such as carboxyacetyl, carboxypropionyl, carboxybutyryl, maleyl or the corresponding amides; in addition, the term acyl includes carbonic acid derivatives, such as aminocarbonyl or alkoxycarbonyl; further examples of suitable aromatic acyl radicals are benzoyl, o-, m- or p-chlorobenzoyl, o-, m- or p-alkylbenzoyl the alkyl group of which having preferably up to 5 carbon atoms such as methylbenzoyl and trifluoromethylbenzoyl, sulfobenzoyl, carboxybenzoyl, benzenesulfonyl, o-, m- or p-chlorobenzenesulfonyl and o-, m- or p-alkyl benzenesulfonyl; of the said substituents, the benzoyl or benzenesulfonyl radical may contain one or more identical or different groups;

R$_2$=(1) hydrogen, (2) alkyl, with preferably up to 3 carbon atoms, (3) alkoxy with preferably up to 3 carbon atoms, or (4) halogen such as chlorine or bromine; preferably R$_2$ represents a hydrogen atom;

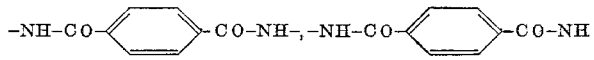

or a cyanuric acid radical;

$n=1$ to 4, preferably 1 or 2.

Particularly suitable dyes are those of the formula

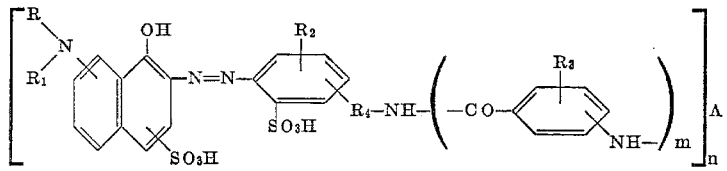

R$_4$=a simple chemical bond or 1,4-phenylene, the simple bond being preferred;

A=an n-valent acyl radical, in particular, —CO—, a carbamoyl radical or the radical of a monofunctional or polyfunctional preferably difunctional aliphatic or aromatic carboxylic acid preferably a di- or polybenzenecarboxylic acid such as

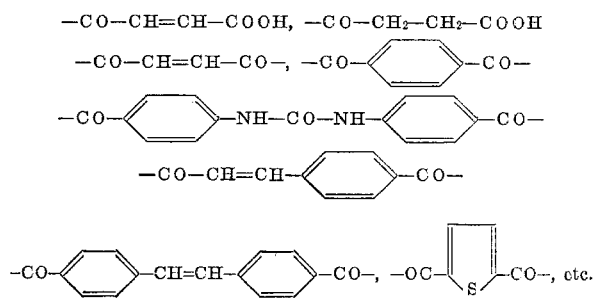

or an acyl radical of cyanuric acid;

Z=hydrogen, or together with the A and the adjoining N forms a phthaloylimid ring such as illustrated by the formula

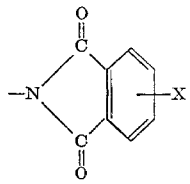

wherein X represents any substituent, in particular another acylamino group such as —NH—CO—CH$_3$,

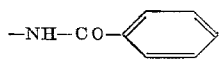

or a multivalent radical such as

wherein $m=0$ to 2, preferably 0 or 1;

R$_3$=(1) hydrogen, (2) alkyl, preferably with up to three carbon atoms, (3) alkoxy, (4) sulfo or (5) halogen, and the other symbols have the above meanings.

The azo dyes to be used according to the invention may be prepared by the usual method by coupling the naphthalene component with suitable diazo components.

The following are examples of suitable naphthalene components: Derivatives of 2-amino-8-hydroxynaphthalene-6-sulfonic acids, such as 2-ureido-8-hydroxynaphthalene-6-sulfonic acid, 2-acetamino-8-hydroxynaphthalene-6-sulfonic acid, 2-carboxypropionyl-amino-8-hydroxynaphthalene - 6-sulfonic acid, 2-(N-methyl-acetamino)-8-hydroxynaphthalene-6-sulfonic acid, 2-(N-ethyl-acetamino)-8-hydroxy-naphthalene-6-sulfonic acid, 2-(N-methyl-carboxypropionylamino) - 8-hydroxy-naphthalene-6-sulfonic acid; as well as 2-benzoylamino-8-hydroxynaphthalene-6-sulfonic acid and 2 - benzenesulfonylamino-8-hydroxynaphthalene - 6-sulfonic acid, where the benzoyl or benzenesulfonyl radical may be further substituted, e.g., by lower alkyl or alkoxy having up to 5 carbon atoms, such as methyl, ethyl, trifluoromethyl or methoxy, or by halogen such as fluorine, chlorine or bromine.

Examples of derivatives of 1-amino-5-hydroxynaphthalene-7-sulfonic acids are 1-acetamino-5-hydroxynaphthalene - 7-sulfonic acid, 1-propionylamino-5-hydroxynaphthalene - 7-sulfonic acid, 1-benzoylamino-5-hydroxynaphthalene - 7-sulfonic acid and 1-benzene-sulfonylamino-5-hydroxynaphthalene - 7-sulfonic acid. Other important naphthalene components are N-acyl derivatives of 2-amino-5-hydroxynaphthalene-7-sulfonic acid, such as 2-acetamino - 5-hydroxynaphthalene-7-sulfonic acid, 2-(N-methyl-acetamino)-5-hydroxynaphthalene-7-sulfonic acid, 2 - benzoylamino- or 2-benzenesulfonylamino-5-hydroxynaphthalene-7-sulfonic acid and their N-alkyl derivatives such as 2-(N-methyl-benzoylamino)-5-hydroxynaphthalene-7-sulfonic acid, etc.

Suitable diazo components are 4-nitro-1-aminobenzene-2-sulfonic acid or derivatives of 1,4-diamino-benzene-2-sulfonic acid, the nitrogen atom of which carries an acyl radical in the 4-position, e.g., 1-amino-4-(3'- or 4'-nitrobenzoylamino)-benzene-2-sulfonic acid. Other compounds which may be used as diazo components are, for example, N,N'-bis-(4' - amino-3'-sulfophenyl-1')-urea, and terephthalic acid-bis-(4 - amino-3-sulfo-anilide). The benzene ring which carries the amino group which can be diazotized may be further substituted by methyl, ethyl or methoxy.

The following are examples of dyes which are particularly suitable:
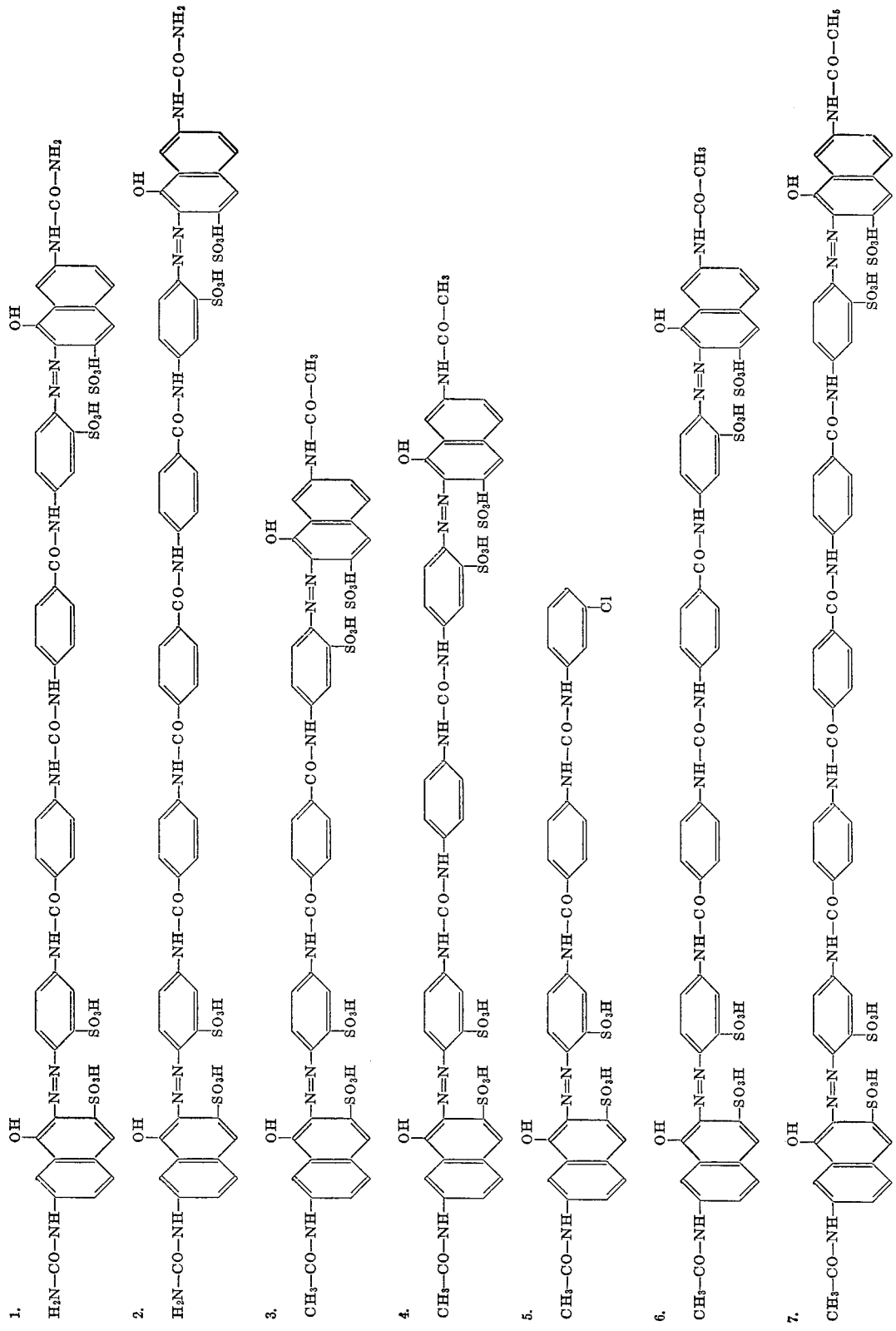

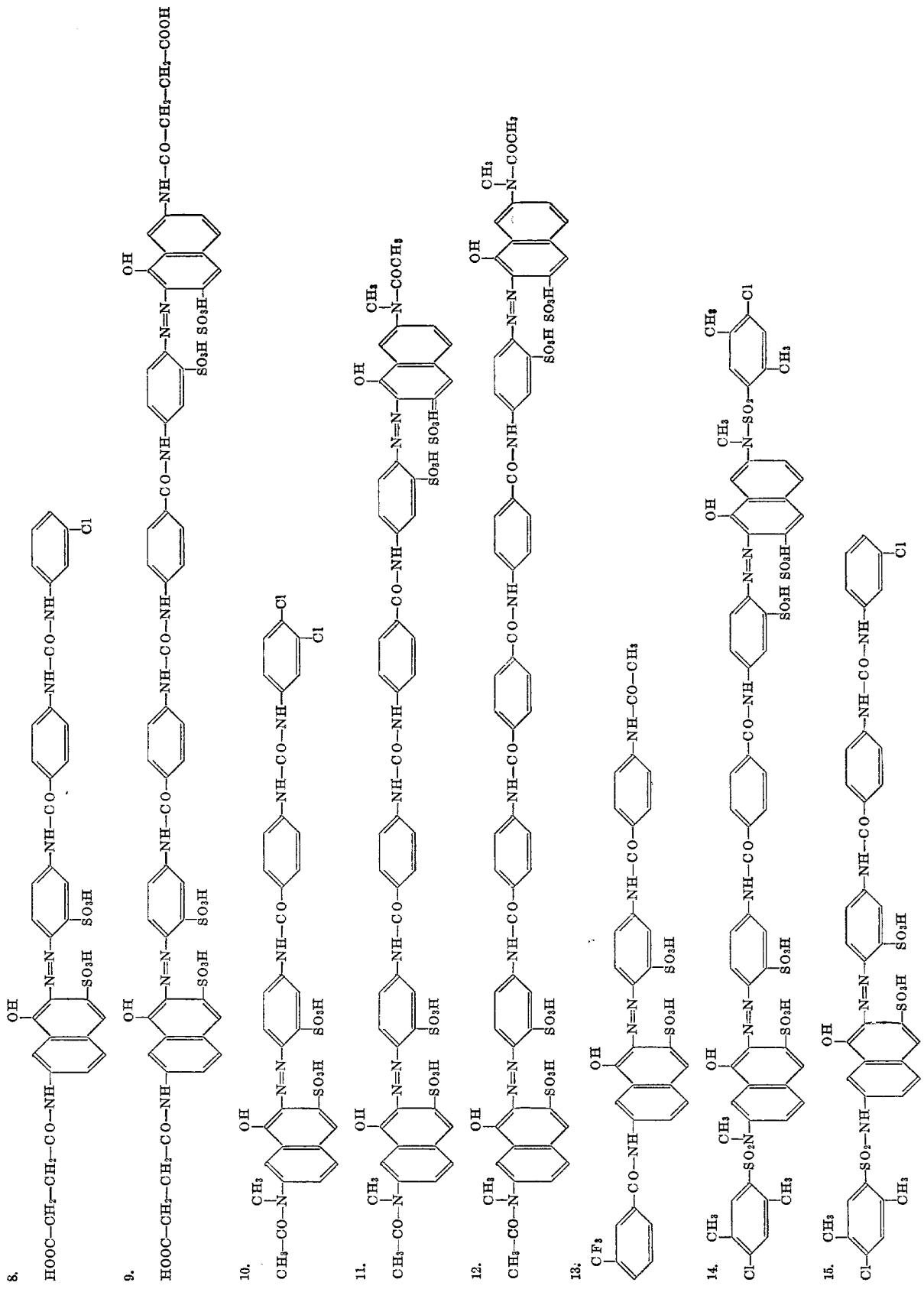

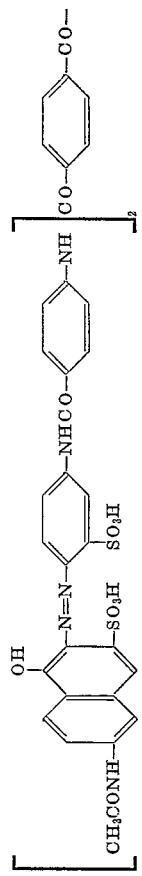
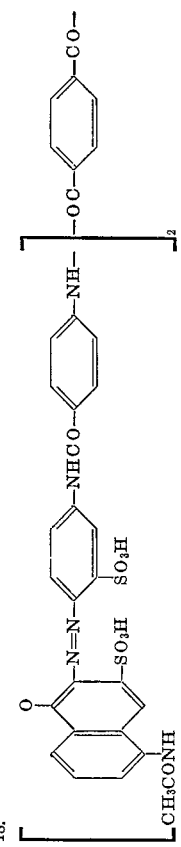
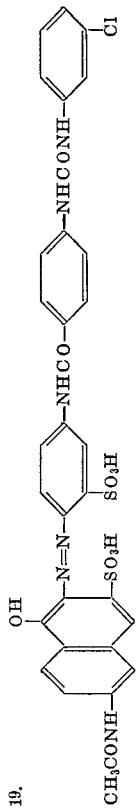
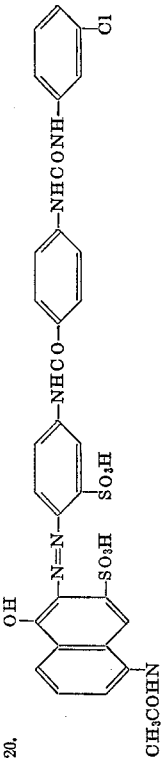
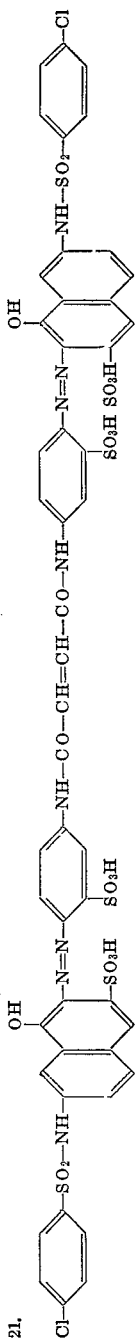
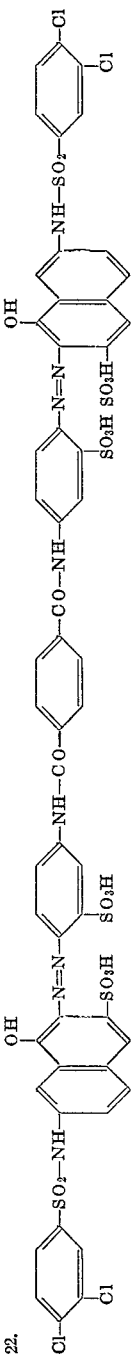

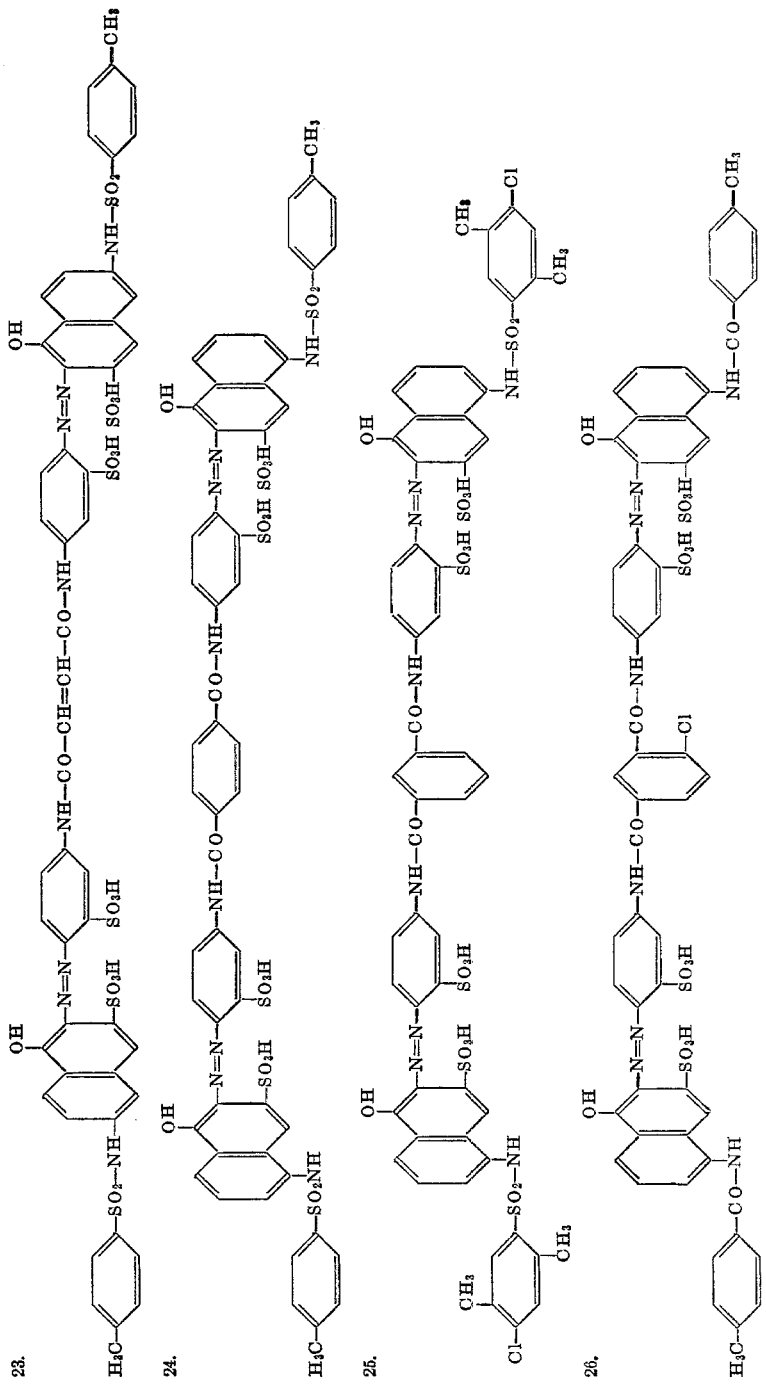

As the preceding formulae of suitable dyes show, both monoazo dyes ($n=1$ in the general formula) and polyazo dyes, preferably bis-azo dyes ($n=2$ in the general formula) are suitable.

The azo dyes of the invention are superior to known azo dyes with respect of the good combination of brilliancy and fastness to light. It has already been known for a long time that very brilliant azo dyes generally show very little fastness to light, whereas, on the other hand, dyes which are very fast to light, e.g., most of the metal complex dyes, show only moderate brilliance. The compounds according to the invention on the other hand, satisfy both requirements to a considerable extent. Most advantageous are derivatives of 2-acylamino-8-hydroxynaphthalene-6-sulfonic acid, of 1-acylamino-5-hydroxynaphthalene-7-sulfonic acid and of 2-acylamino-5-hydroxynaphthalene-7-sulfonic acid as the azo component of the dye. Unexpectedly and especially brilliant nuances are obtained without the pronounced blue shift of the color tones otherwise occurring if in addition to acyl the amino group is substituted further by an alkyl group, in particular a very short-chained alkyl group.

Particular utility is exhibited by dyes wherein the acyl radical on the amino group in the naphthalene nucleus is as short as possible, so that the fragment containing the naphthalene nucleus which is formed upon bleaching of the azo dye, can be washed out. This is particularly important as regards the high degree of hardening of the photographic layers necessary for materials to be used in the silver-dye-bleach process. Moreover, acylamino-acyl-amino substitutions shift the hues too far into the longer wave region.

On account of their excellent properties, the dyes according to the invention can be applied in color photographic layers for the silver-dye-bleach process in various ways. As will be seen from the following examples, they are preferably employed as image dyes in layers which are subjected to a simple black-and-white development and consequently form in the subsequent dye bleaching bath a direct positive dye image. However, it is also possible to carry out a black-and-white reversal development, whereby after treatment with common dye-bleaching bath, dye images with a gradation opposite to the original are obtained.

The dyes are substantially inert to agents customarily added to photographic layers, such as stabilizers, sensitizing dyes, chemical sensitizers, plasticizers, wetting agents, hardeners and the like.

As shown in the following example, they can be bleached out to pure whites in different types of bleaching baths, such as those which are based on quinoline and iodide, as described in U.S. Pat. No. 2,629,568 (Example 29) or thiourea (as indicated in British Pat. No. 507,211) and with different bleaching catalysts, such as quinoxalines or phenazine derivatives.

They can be applied onto any suitable supports, such as glass, baryta-coated papers, papers of all types which have been made water repellent, such as polyethylene-coated papers, cellulose acetate or polyesters and polycarbonate films and pigmented celluose acetate films.

The image whites are also not discolored by exposure to light over long periods.

EXAMPLE 1

150 ml. of a 2% gelatin solution which contains 3.2 g. of dye 4 and 0.35 of saponine are added to 500 ml. of silver bromide-silver iodide (3 mol percent) gelatin emulsion which contains about 15 g. Ag in the form of silver halide per kg. of emulsion. The emulsion is sensitized to green light with a sensitizer as described in German Auslegeschrift No. 1,213,240, Example 2 and is applied onto supports one of bartya-coated paper and one of cellulose triacetate. The silver content is about 0.75 g. Ag in the form of silver halide per sq. m. After drying, 2 test strips of the material produced as described are exposed behind a grey test wedge to yellow light or white light and processed as follows:

(1) Development for 5 minutes in a solution of 1 g. of p-methylaminophenol, 13 g. of anhydrous sodium sulfite, 3 g. of hydroquinone, 26 g. of anhydrous soda, and 1 g. of potassium bromide in 1000 ml. of water.

(2) Rinsing for 1 minute.

(3) Fixing for 5 minutes in a solution of 200 g. of crystalline sodium thiosulfate, 20 g. of potassium metabisulfite in 1000 ml. of water.

(4) Rinsing for 5 minutes.

(5) Hardening for 5 minutes in a solution of 60 ml. of formalin (30%) and 15 g. of sodium bicarbonate in 1000 ml. of water.

(6) Rinsing for 5 minutes.

(7) Dye-bleaching for 15 minutes in a solution of 10 g. of potassium iodide, 10 g. of sodium hypophosphite, 25 ml. of concentrated sulfuric acid, 50 ml. of quinoline, and 10 g. of 2,3-dimethylquinoxaline in 1000 ml. of water.

(8) Rinsing for 5 minutes.

(9) Bleaching for 5 minutes in a bath of 25 g. of copper chloride and 5 ml. of concentrated hydrochloric acid in 1000 ml. of water.

(10) Fixing for 10 minutes, as under 2.

(11) Final rinsing for 20 minutes.

After drying, two diffusion-resistant magenta-colored dye images of the test wedge are obtained with satisfactory whites on a transparent and reflecting support, the color of which is not changed even with relatively long exposure to daylight. The light fastness thereof is superior to that of similar prior art dyes.

EXAMPLE 2

The process is performed as described in Example 1, with the exception that dye 11 is used instead of dye 4 and the emulsion applied onto a white pigmented cellulose acetate foil. After exposure and processing in baths 1 to 6 as in Example 1, the process is continued as follows:

(7) Dye-bleaching for 5 minutes in a solution of 28 g. of thiourea, 18 g. of potassium bromide, 3 mg. of 2-amino-3-hydroxyphenazine and 400 ml. of concentrated hydrochloric acid in 1000 ml. of water.

(8) Rinsing for 5 minutes.

(9) Bleach-fixing for 10 minutes in a solution of 26 g. of tetrasodium-ethylenediamine-tetraacetate, 24 g. of anhydrous soda, 15 g. of ferric chloride, 13 g. of anhydrous sodium sulfite and 200 g. of crystallized thiosulfate in 800 ml. of water.

(10) Final rinsing for 20 minutes.

After drying, a result quite similar to that in Example 1 is obtained, but the color of the test wedge is even more brilliant.

EXAMPLE 3

The process is performed as described in Example 1 but instead of the dye 4, 2.8 g. of dye 12 are used. After exposure and processing, color images of high brilliance are obtained.

EXAMPLE 4

The process is performed as described in Example 1 but instead of the dye 4, the dyes of Formulae 5, 7 or 14 or any of the other dyes mentioned in the table are used. The results are similar to that of Example 3.

EXAMPLE 5

The process is performed as described in Example 2 but after exposure, the film is processed as follows:

(1) Development for 5 minutes in a bath, as indicated in Example 1.

(2) Rinsing for 1 minute.

(3) Bleaching for 1 minute in a solution of 10 g. of potassium dichromate, and 5 g. of concentrated sulfuric acid in 800 ml. of water.

(4) Rinsing for 1 minute.

(5) Clarifying for 1 minute in a bath of 5 g. of anhydrous sodium sulfite in 1000 ml. of water.

(6) Rinsing for 1 minute.

(7) Second uniform exposure for 2½ minutes with a 40 watt lamp at a distance of 20 cm.

(8) Second development as under 1.

(9) Hardening and further processing as in Example 1, using the baths 5–11.

A magenta dye wedge is obtained which has a gradation opposite to that of the original.

EXAMPLE 6

A color-photographic multi-layer material for the silver-dye-bleach process is prepared as follows:

The following layers are successively cast onto a baryta-coated paper:

(1) A red-sensitized layer, which contains per 500 g. of a silver bromide gelatin emulsion containing about 2 mol percent of silver iodide, 12 mg. of the sensitizer described in Example 11 of German Patent No. 1,177,481, and 2.3 g. of the dye

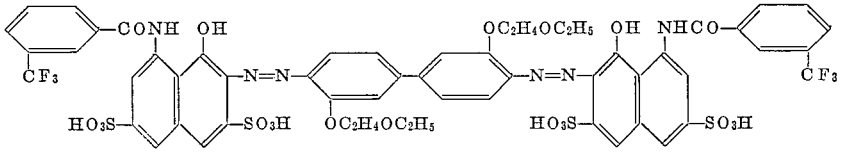

(prepared according to German Patent No. 1,041,355) dissolved in 250 ml. of a 2% gelatin solution, containing 2.5 of a 30% aqueous solution of formaldehyde as hardener and 0.4 g. of saponine. The final layer contains 0.8 g. of silver in the form of silver halide per square meter.

(2) An intermediate layer of 3.5% gelatin solution.

(3) A green sensitized layer as indicated in Example 2.

(4) An intermediate layer of a 4% gelatin solution containing 8 g. of tartrazine per liter.

(5) A non-sensitized silver bromide gelatin emulsion layer with a silver content of about 12 g./kg. (in the form of silver halide) which contains per 500 g. 2.7 g. of the yellow dye of the following formula:

$$\left[\begin{array}{c} \text{(structure with } SO_3H, N=N, CH_3, NH, \text{phenyl-triazole, } SO_3H\text{)} \end{array} -OC-CH=CH-CO- \right]_2$$

The final layer contains about 0.65 g. silver in the form of silver halide per square meter.

(6) A protective layer of a 2% gelation solution.

After drying, the material is exposed behind a multicolor transparent original and processed as described in Example 1, with the exception that 50–100 mg. of 2,3-dimethyl-quinoxaline are added to the bleaching bath and the processing period is increased to 25 minutes.

We claim:

1. Light-sensitive photographic material with at least one silver-dye-bleach silver halide emulison layer in which the silver-dye-bleach dye is an azo dye of the following formula:

$$\left[\begin{array}{c} \text{(naphthalene with } OH, SO_3H, R, R_1, N\text{)-}N=N\text{-(phenyl with } R_2, SO_3H\text{)-}NH\text{-}\left(CO\text{-(phenyl with } R_3\text{)-}NH\text{-}\right)_m \end{array}\right]_n A$$

wherein
R=(1) hydrogen, (2) alkyl with up to 5 carbon atoms or (3) aryl;
R₁=an acyl radical of an acid selected from the group consisting of aliphatic carboxylic having up to 5 carbon atoms, aliphatic sulfonic having up to 5 carbon atoms, benzoic, sulfonic and carbonic acids;
R₂=(1) hydrogen, (2) alkyl, (3) alkoxy or (4) halogen;
R₃=(1) hydrogen, (2) alkyl, (3) alkoxy, (4) sulfo or (5) halogen;
A=an n-valent acyl radical of a monovalent carboxylic acid or of a bivalent carboxylic acid selected of the group consisting of carbonic acid, succinic acid, fumaric acid, benzene dicarboxylic acid, carboxy-cinnamic acid, stilbene dicarboxylic acid or thiophene dicarboxylic acid or from cyanuric acid;
n=1 or 2; and
m=0 to 2.

2. Light-sensitive photographic material as defined in claim 1, wherein m=0 or 1.

3. A light-sensitive photographic material as defined in claim 1 in which the dye ha sthe formula:

$$\left[\begin{array}{c} \text{(naphthalene with } R_1, R, N, OH, SO_3H\text{)-}N=N\text{-(phenyl with } SO_3H\text{)-}NH\left(CO\text{-(phenyl)-}NH\text{-}\right)_m \end{array}\right]_2 A$$

4. Light-sensitive photographic material as defined in claim 3, wherein the azo dye has the following formula:

$$\left[\begin{array}{c} \text{(naphthalene with } R_1, R-N, OH, SO_3H\text{)-}N=N\text{-(phenyl with } SO_3H\text{)-}NHCO\text{-(phenyl)-}NH\text{-} \end{array}\right]_2 A$$

5. Light-sensitive photographic material as defined in claim 3, wherein the azo dye has the following formula:

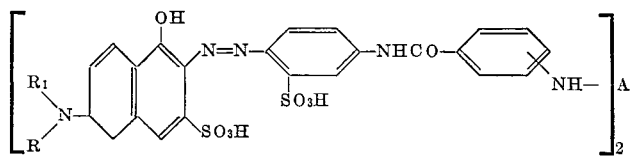

6. Light-sensitive photographic material as defined in claim 3, wherein the azo dye has the following formula:

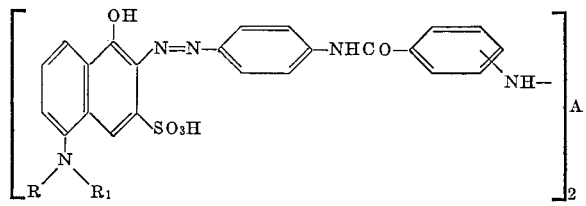

7. Light-sensitive photographic material as defined in claim 1, wherein the azo dye has the following formula:

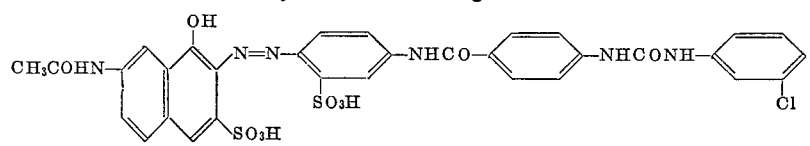

8. Light-sensitive photographic material as defined in claim 1, wherein the azo dye has the following formula:

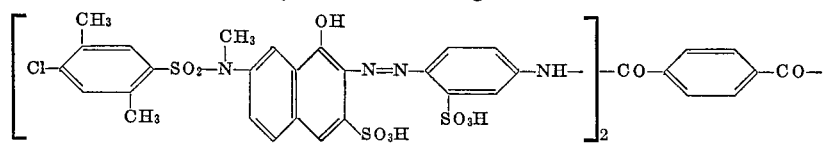

9. Light-sensitive photographic material as defined in claim 6, wherein the azo dye has the following formula:

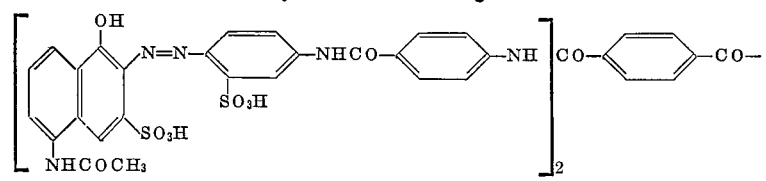

References Cited

UNITED STATES PATENTS

| | | | |
|---|---|---|---|
| 2,294,893 | 9/1942 | Carroll et al. | 96—99 |
| 3,443,952 | 5/1969 | Anderau | 96—99 |

J. TRAVIS BROWN, Primary Examiner